United States Patent [19]
Foley, Jr. et al.

[11] 3,767,925
[45] Oct. 23, 1973

[54] APPARATUS AND METHOD FOR DETERMINING THE SPATIAL DISTRIBUTION OF CONSTITUENTS AND CONTAMINANTS OF SOLIDS

[75] Inventors: Eugene Burdett Foley, Jr., Morris Plains; Alfred Urquhart MacRae, Berkeley Hts.; Douglas Leon Simms, Orange; Norman Henry Tolk, Mendham; Clark Woody White, Dover, all of N.J.

[73] Assignee: Bell Telephone Laboratories, Incorporated, Murray Hill, Berkeley Heights, N.J.

[22] Filed: Mar. 8, 1972

[21] Appl. No.: 232,872

[52] U.S. Cl. .................... 250/251, 250/307, 356/85
[51] Int. Cl. ............................................ H01j 37/26
[58] Field of Search................ 250/49.5 P, 49.5 R, 250/251, 307; 356/85

[56] References Cited
UNITED STATES PATENTS

| | | | |
|---|---|---|---|
| 3,644,044 | 2/1972 | Tolk et al. .................... | 250/49.5 P |
| 3,415,985 | 11/1968 | Castaing et al. ................ | 250/49.5 P |
| 3,217,162 | 11/1965 | Wehner........................ | 250/49.5 R |
| 3,096,437 | 7/1963 | Muray......................... | 250/49.5 C |
| 2,772,363 | 11/1956 | Robinson ..................... | 250/41.9 SE |
| 3,206,598 | 9/1965 | Wegmann ..................... | 250/41.9 B |

OTHER PUBLICATIONS

"Method for Studying Spattered Particles by Emission Spectroscopy" by Sawatsky et al. October 1966 Scie. Inst.

*Primary Examiner*—James W. Lawrence
*Assistant Examiner*—B. C. Anderson
*Attorney*—W. L. Keefauver

[57] ABSTRACT

The spatial distribution of constituents and contaminants in a solid is determined either by (1) scanning the surface of the solid with a focused ion or neutral particle beam to sputter excited particles from the surface, resulting in photon emissions characteristic of the sputtered particles, and detecting the photon emissions over the scan period, or by (2) flooding the surface with a diffuse beam, and photographically recording the distribution of photon emissions. Continued sputtering results in removal of surface material and detection of the photon count rate or a sequence of photographs taken during each successive scan period indicates the distribution of constituents and contaminants in the bulk of the solid as a function of distance from the surface.

9 Claims, 2 Drawing Figures

PATENTED OCT 23 1973  3,767,925

APPARATUS AND METHOD FOR DETERMINING THE SPATIAL DISTRIBUTION OF CONSTITUENTS AND CONTAMINANTS OF SOLIDS

BACKGROUND OF THE INVENTION

1. Field of the Invention

This invention relates to a method and apparatus for analyzing solids by means of collisions with a gaseous particle beam to produce characteristic spectra.

2. Prior Art

In U.S. Pat. No. 3,644,044, issued on Feb. 22, 1972 and in pending application Ser. No. 225,414, filed Feb. 11, 1972, now abandoned which is a continuation-in-part of said patent, both the patent and the application assigned to the present assignee, there is described a new technique for the surface analysis of solids which relies upon the discovery that photon emissions characteristic of the surface constituents may be produced by bombarding the surface with a low energy particle beam. This technique offers several advantages over prior analysis techniques, such as mass spectrometer analysis, ion back scattering and glow discharge. Such advantages include low power consumption, leading to negligible damage to the surface and a highly sensitive surface probe (only a few monolayers of material need be removed in order to obtain detectable levels of photon emissions), and simplicity of design and operation.

However, such surface analysis does not provide any information about either the bulk composition of the sample or about the distribution of constituents or contaminants in the sample.

SUMMARY OF THE INVENTION

In accordance with the invention, the spatial distribution of constituents and contaminants within a solid sample is determined by surface scanning and depth scanning the sample with a charged or neutral particle beam to sputter excited state particles from the sample to produce photon emissions characteristic of the sputtered particles, and detecting these photon emissions in a manner which enables the correlation of the emission peaks with the location within the sample from which the excited-state particles were sputtered.

Due to the low sputtering rates which result from the use of beam energies near the lower limit of those required to produce photon emissions, a preferred embodiment is one in which surface scanning is carried out at such low beam energies in order to achieve minimal surface damage during analysis. A second preferred embodiment is one in which depth scanning is carried out at high beam energies, so as to achieve a commercially feasible sputtering or depth scanning rate.

Such spatial distributions may be determined using apparatus including means for producing a particle beam, means for varying the energy of the beam and for directing the beam onto the sample, means for changing the relative positions of the beam and the sample, means for detecting at least a portion of the intensities of photon emissions according to the energies of these emissions, and means for maintaining at least a partial vacuum around the beam and sample.

In a preferred embodiment, the apparatus includes an ion beam source, and means for converting the ion beam to a neutral beam, which is preferred in certain cases, such as for use with an insulating or semiconducting sample.

In another embodiment of the apparatus, means are provided for sputtering sample material onto an insulating or semiconducting substrate, which substrate is maintained in the path of the beam. The beam, preferably of neutral species, then sputters excited-state sample particles from the substrate to produce photon emissions. Means may also be provided to direct these photon emissions into the detection means.

DETAILED DESCRIPTION OF THE INVENTION

Figure 1:
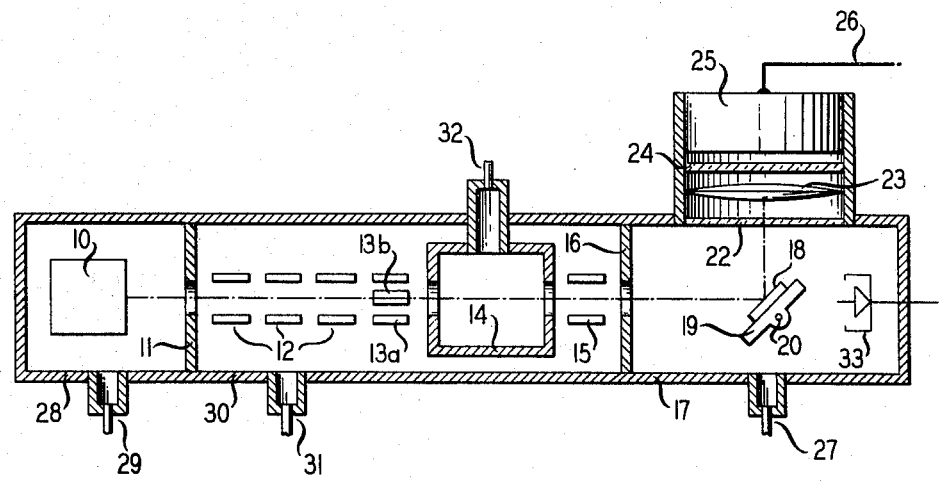
FIG. 1 is a cross-sectional diagram of an embodiment of the inventive apparatus in which the position of the solid sample is variable.

Referring now to FIG. 1 there is shown one embodiment of the inventive apparatus in which ion source 10 provides ions, apertured partition 11 collects the ions, ion lenses 12 accelerate the ions to the proper energy while also focusing the ions into an ion beam and directing the beam through beam deflector 13, charge exchange chamber 14 and deflector plates 15, and through apertured partition 16 into collision chamber 17 containing the sample 18 to be analyzed. Production of ions may be by any technique known in the art such as electron impact ionization.

Ion acceleration is critical to the obtaining of the collision-induced emissions. The acceleration step must in general produce ions having energies of at least 3 to 5 electron volts above the energy arrived at by the following equation:

$$E = E_s + (m_1 + m_2/m_2) E^*,$$

where $E_s$ is the threshold energy for the sputtering of surface atoms in their electronic ground states, $E^*$ is the excitation energy of a specific excited state of the sputtered atom, $m_1$ is the mass of the incident ion or molecule, and $m_2$ is the mass of the sputtered atom.

Standard excitation energies $E^*$ are known, and are therefore not a necessary part of this description. They are obtainable, for example, in energy level tables published by the National Bureau of Standards. Likewise, threshold energies $E_s$ are known for a number of ionic species incident on a variety of surfaces, but in any event are readily determinable by simple experimentation.

The species chosen to collide with the sample surface must do so at a sufficient energy to sputter excited particles therefrom, and thus may be of any element except hydrogen, whose mass is in general insufficient to cause significant sputtering at low energies due to insufficient momentum transfers. It will ordinarily be preferred to choose relatively stable gases having substantial masses such as nitrogen and the rare gases, Ne, Ar, Kr, and Xe.

Beam deflector 13 comprises $x$ and $y$ beam deflection plates 13a and 13b, respectively. Scanning of the sample surface 18 may thus be achieved, for example, by operating one set of deflection plates to index the beam to successive row positions and operating the other set of deflection plates to sweep the beam successively across each row, in a manner similar to the operation of a television tube raster scanner. Associated circuitry appropriate for achieving such scanning is known, and is not a necessary part of this description.

Since the photon production efficiency has been found to vary with angle of incidence of the beam upon the sample, in the case of beam scanning, it is preferred to keep the sample dimensions small in relation to the distance from the x-y beam deflector in order to minimize variations in photon count rate during scanning.

The charge exchange chamber 14 and deflecting plates 15 may be used, if desired, to form a neutral particle beam, wherein a portion of ion beam 13 is neutralized by charge exchange with a gas admitted to the chamber through port 32, and the non-neutralized portion is deflected from the beam path by plates 15. It is preferred to adjust the gas density so as to achieve a neutralization rate of 20 to 30 percent, below which the efficiency is too low to be practical, and above which the probability of secondary collisions is significant.

Collision chamber 17 may be evacuated through port 27, while chambers 28 and 30 are evacuated through ports 29 and 31. In general, a pressure in the chambers of $\sim 1 \times 10^{-3}$ Torr or less will be required, while a pressure of about $5 \times 10^{-6}$ Torr or less in the collision chamber is preferred, in order that the intensity of photon emissions from sources other than the sample surface be negligible in comparison to the spectral peaks of interest. These pressures are readily achieved by diffusion pumping. Liquid nitrogen trapped mercury diffusion pumping is, in general, preferred over oil diffusion pumping in order to minimize excessive hydrocarbon contamination.

Where a sample surface exhibits a conductivity value which is low enough to permit significant charge buildup on the surface and resultant repulsion of incoming ions, e.g., where the surface is insulating or semiconducting, charge buildup may be avoided by use of a neutral beam in place of the ion beam. However, where such charge buildup is not a problem, use of the ion beam may be preferred.

The sample 18 is secured within a recessed portion of sample support 19, which is in turn mounted on rod 20. The angular relation of the sample to the beam may be adjusted by pivoting support 19 about rod 20, perferably to an angle of incidence of about 35° to 80° with the surface normal, below which angle photon production is relatively inefficient, and above which angle maintaining the sample surface in the beam path may become difficult. Photon emissions resulting from sputtering of excited-state particles from the sample 18 by beam 13 pass through quartz window 22 and are focused by quartz lens 23 through narrow band transmission filter 24 to photomultiplier tube 25. Signals produced by photon detection are carried by lead 26 to conventional signal processing equipment, not shown, where the counting rate is determined and registered. Faraday cup 33 may be used to measure ion beam intensity by swinging sample support 19 out of the beam path.

Means may be provided for correlating the count rate to coordinate or grid points on the sample support and for plotting such correlation as a graphical representation of the distribution of photon emission intensities over the surface of the sample. Such means are known, and do not form a necessary part of this description. Alternatively, knowning the sample scanning rate, the sample dimensions and the photon counting rate enables the manual plotting of photon intensity variations as a function of surface locations on the sample.

The basic technique and apparatus for analyzing solids by sputtering excited particles therefrom to produce photon emissions has been described in copending application Ser. No. 225,414, filed Feb. 11, 1972, now abandoned assigned to the present assignee. As there stated, a principal advantage of the technique lies in the fact that excited-state particles may be sputtered from the sample surface with low energy, i.e., 100 to 4,000 eV, particle beams. Thus, typically only a few monolayers of surface atoms are removed by the low energy beam, giving rise to an extremely sensitive and essentially non-destructive surface analysis technique. This advantage is, of course, inherent in the surface scanning aspect of the invention already described. However, another aspect of the present invention relies in part upon the fact that high energy beams, e.g., greater than 4,000 eV, also sputter excited-state particles from the sample surface, but at an increased sputtering rate. Thus, continuing surface scanning with such a high energy beam results in substantial removal of sample material by sputtering, resulting in a "depth scan" of the sample within a commercially feasible period of time. The apparatus of FIG. 1 is, of course, suitable for carrying out such depth scanning, and increased sputtering rates are obtainable by adjusting ion lens 12.

While it may be possible to surface scan a sample for the presence of several elements simultaneously, by use of a spectrometer to obtain an energy spectrum of photon emissions for each grid point of the scan, it will ordinarily be preferred to scan for each element separately by use of narrow band transmission filters to admit photons characteristic of the element to the photomultiplier tube, such as in the case in which the basic composition of the sample is known and the distribution of one or more contaminants therein is sought to be determined.

Scanning of the sample surface may also be achieved by moving the sample with relation to a fixed beam position. For example, a sample manipulation may be provided which is capable of moving the sample through a sequence of positions with relation to $x$ and $y$ coordinates lying in the plane of the sample. Such manipulation may, for example, be by $x$ and $y$ servomechanisms actuated by a programming circuit, mechanical timers or by other means known in the art.

As an alternative to surface scanning by changing the relative positions of the sample and beam, a photon intensity distribution pattern may be obtained by replacing photomultiplier tube 25 with a camera. In this embodiment, ion lenses 12 may be adjusted to produce a diffuse beam to flood the surface of the sample and the variation in photon intensity over the surface recorded on the film of the camera. Depth scanning, preferably with a beam energy of at least 4,000 eV, may be achieved by successively exposing fresh film at timed intervals during beam bombardment.

Figure 2:
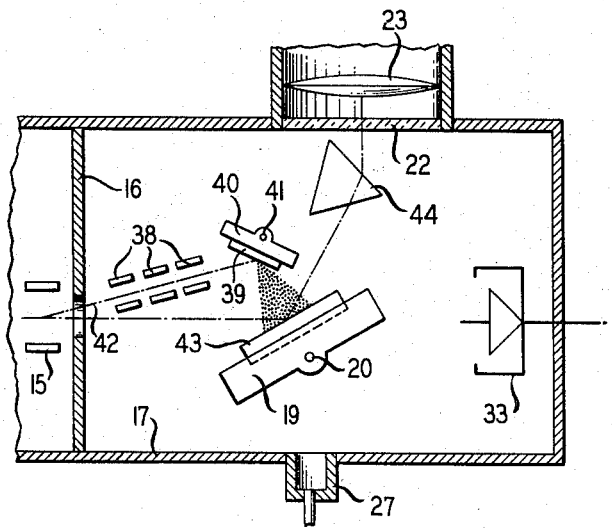
FIG. 2 is a cross-sectional diagram of a portion of another embodiment of the apparatus in which sample material is sputtered onto a substrate prior to analysis.

Referring now to FIG. 2, there is shown another embodiment of the inventive apparatus in which the apparatus of FIG. 1 is modified by placing sample support 40 pivoted on rod 41 in the collision chamber at a position above the beam path. The sample 39 to be analyzed is then placed on support 40. Ion lens 38 focuses the ions deflected from the beam into a second beam 42, which sputters the material from the sample onto substrate 43, located on sample support 19. The undeflected neutral beam then sputters sample material from the substrate 43. The beam energies are preferably adjusted to give sputtering rates such that no more than a few monolayers of sample material accumulate on the substrate before being sputtered off. Prism 44 directs resultant photon emissions into the detection portion of the apparatus. This arrangement may give rise to substantially increased photon excitation efficiencies where the sample material is a metal and the substrate is an insulator or semiconductor, since it results in fewer instances of non-radiative de-excitation than would occur in sputtering directly from the metal surface.

We claim:

1. Apparatus for determining the spatial distribution of one or more constituents in a solid mass comprising:
    means for generating an ion beam of sufficient energy to sputter excited-state particles from the mass,
    means for maintaining at least a partial vacuum around the beam and mass, said means including an enclosure containing first and second partitions, the partitions dividing the enclosure into first, second and third vacuum chambers, the first partition defining an ion collecting aperture and the second partition defining a beam entrance aperture, the beam generating means positioned within the first chamber in spaced relation to the ion collecting aperture, the beam generating means and ion collecting aperture defining a beam path, and the mass positioned within the third vacuum chamber in spaced relation to the beam entrance aperture and within the beam path,
    means for focusing and accelerating the beam, said means located within the second vacuum chamber in spaced relation to the ion collecting aperture and within the beam path,
    means for changing the relative positions of the ion beam and the mass comprising first means for deflecting the beam so that a surface area of the mass is scanned by the beam, the first deflecting means positioned within the second vacuum chamber between the focusing and accelerating means and the second partition and within the beam path,
    charge exchange means for converting a significant proportion of the ions in the ion beam, after deflection, into neutral particles, the charge exchange means comprising a chamber within the second vacuum chamber between the first deflecting means and the second partition, the charge exchange chamber defining a beam entrance aperture and a beam exit aperture within the beam path and having a gas port extending through the enclosure,
    second means for deflecting ions, unconverted by the charge exchange means, from the beam of neutral particles so that the deflected ions do not impinge on the mass, the second deflecting means positioned within the second vacuum chamber between the charge exchange chamber and the second partition,
    means for successively measuring the intensity of photon emissions from the excited-state particles as the surface is scanned, and
    means for discriminating between photon emissions of different energies, said means positioned between the mass and the intensity measuring means.

2. Apparatus of claim 1 in which means are provided for rotating the mass about an axis so as to adjust the angular relation of the normal to a surface portion of the mass with the beam path.

3. Apparatus of claim 1 in which means are provided for measuring the intensity of the ion beam.

4. Apparatus of claim 1 in which:
    second focusing and accelerating means are positioned in spaced relation to the second beam deflection means so as to form a second beam,
    the mass is positioned in spaced relation to the second focusing and accelerating means and within the second beam path, and
    a substrate is positioned within the third vacuum chamber within the first beam path.

5. A method for determining the spatial distribution of one or more constituents in a solid mass containing more than one component substance comprising successively sputtering excited-state particles from different exposed surface regions of the solid mass and successively measuring photon emissions from said particles.

6. The method of claim 5 in which successive sputtering of different regions is accomplished by scanning a surface area of the mass with a particle beam of sufficient energy to cause sputtering of excited-state particles from the surface.

7. The method of claim 6 in which the successive sputtering of different regions and successive measuring of photon emissions is repeated at least once to obtain spatial distributions from successively deeper surfaces exposed by said sputtering.

8. The method of claim 6 wherein the particle beam is generated as an ion beam, the scanning is accomplished by deflection of the ion beam, and a significant proportion of the ions in the deflected beam are converted by charge transfer to neutral particles before they contact the solid mass.

9. The method of claim 8 in which the beam energies are at least 4,000 electron volts.

* * * * *